United States Patent [19]

Roche

[11] 4,286,353
[45] Sep. 1, 1981

[54] MULTI-ELEMENT CONNECTION FOR STRUCTURAL MEMBERS

[75] Inventor: John N. Roche, Greenville, Pa.

[73] Assignee: R. D. Werner Co., Inc., Greenville, Pa.

[21] Appl. No.: 968,211

[22] Filed: Dec. 11, 1978

[51] Int. Cl.³ ............................................. E05D 11/10
[52] U.S. Cl. ........................................ 16/143; 403/81; 403/102
[58] Field of Search ................. 16/143, 144, 145, 175, 16/178; 403/81, 82, 92, 96, 49, 102; 182/115; 135/4 B

[56] References Cited

U.S. PATENT DOCUMENTS

| 1,199,732 | 9/1916 | Miller | 403/92 X |
| 2,863,466 | 12/1958 | Small | 403/81 X |
| 3,187,373 | 6/1965 | Fisher | 16/144 |
| 4,111,217 | 9/1978 | Victor | 16/144 X |

Primary Examiner—Doris L. Troutman
Attorney, Agent, or Firm—J. Helen Slough

[57] ABSTRACT

A multi-element connection for structural members adapted to connect the structural members in co-linear arrangement and to automatically lock these members in such position, which connection is adapted to be rotated or folded to bring such structural members into such co-linear or lapped position with respect to each other, the connection being comprised of a latch element secured or integral with one of the members and a clevis element secured or integral with another of said members, the latch element having a cam surface and an arcuate notch with end abutments whereby a latching member in said clevis element may ride on the cam surface and be brought into engagement with said notch to lock said elements and co-joined structural members.

9 Claims, 8 Drawing Figures

MULTI-ELEMENT CONNECTION FOR STRUCTURAL MEMBERS

The present invention relates, generally to connections for structural members and, more especially, to a multi-element connection therefor whereby same elements may be rotated or folded to achieve a desired co-linear or lapped arrangement of several or more structural elements and may be locked when in the co-linear position. The locking connection of the present invention is particularly suitable for use in foldable frameworks which are designed for, e.g., scaffolds, racks, stages, and the like.

Foldable scaffolding and the like which employ collapsible hinge members adapted to lock the elements of the scaffolding in place during use are well known. For example, U.S. Pat. No. 3,221,837 discloses such a structure having a hinge connection formed by a pair of cooperating members pivotally connected in order that the same can rotate or pivot relative to one another. In a closed and locked configuration, a pair of cooperative shoulders mutually interfere, under the action of a spring, to provide latching action. The scaffolding is collapsed by releasing or disengaging the locking shoulders whereupon the two members may be rotated and the structual members folded.

U.S. Pat. No. 3,187,373 discloses a locking hinge also specifically adapted for pivotally connecting two members which, along with others, can comprise a scaffold or similar structural device. This hinge construction is comprised of a pair of members which are pivotally connected, and includes a latch plate having a pair of arms adapted to project outwardly of corresponding apertures or bores. In the closed and locked configuration, the latching arms project within or through the apertures or bores, one of each being located on each of the rotatable members. To unlock the hinge device the arms are depressed or otherwise displaced from engagement with these apertures, whereupon the two members may be rotated.

Yet another hinge-type device is disclosed in U.S. Pat. No. 2,863,466, which relates to a tiltable garden umbrella. The conopy portion of the umbrella may be pivotally displaced from the vertical and held in a selectable position by means of a hinge having an upper and a lower member pivotally connected for angular rotation. One of the members includes a projecting tongue while the other is formed with a pair of legs for securing the tongue.

It is an object of the present invention to provide multi-element connecting means adapted to join at least two structural elements secured or integral therewith into pivotal or foldable engagement.

It is another object of the present invention to provide a multi-element connection means which locks automatically when in a closed position and maintains a positive latching action during use.

It is a further object of the present invention to provide a multi-element connection means which although easily released when desired by an operator is protected against accidental release during operation.

Yet another object of the present invention is to provide a multi-element connection means of the character aforesaid which is suitable for use in collapsible structures such as, for example, foldable trusses, scaffolds, barriers, stages, and the like.

In the form of the invention shown in the drawings, the multi-element connection for several structural elements comprises a rotary brace lock which is comprised of a latch plate member having a latch tongue projecting outwardly therefrom, a clevis member having a clevis channel internally thereof, and means joining the latch plate and clevis members in rotary reciprocable engagement whereby the latch tongue is received in the clevis channel in a closed and locked configuration and is pivotally displaceable along an arcuate path to an open and unlocked configuration. Latching is, preferably, achieved by means of a latch member reciprocably received in the clevis member and transversely displaceable with respect to the arcuate path from a latched configuration, wherein the latch member projects into the arcuate path, to an unlatched configuration, wherein the latch member is displaced proximally away from the path. Most preferably, the latch member includes a latch pin which is designed for mating engagement with a latching recess formed in the latch tongue. It is also preferred that the latch member be biased into the latched configuration, for example, by means of a spring.

Other objects of the invention and the invention itself will become more readily apparent by reference to the following description and drawings, in which drawings.

The present invention relates to multi-element connections for structural members, which are comprised of rotary brace locks or latching, pivotal hinge members adapted to lock these members in co-linear relationship. The invention is described herein with reference to the use of such devices in conjunction with a foldable or collapsible framework such as, for example, trusses, scaffolds, barriers, stages, and the like. However, the skilled artisan will recognize that the utility and adaptability of the device of the present invention is not restricted to these precise environments. Therefore, the following description of preferred embodiments is given as illustrative only, and should not be deemed limitative.

Figure 3:
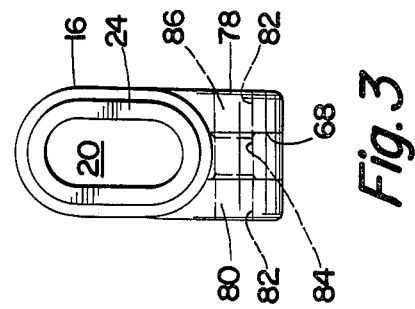
FIG. 3 is an end elevational view of the rotary brace lock of FIG. 2.
Figure 1:
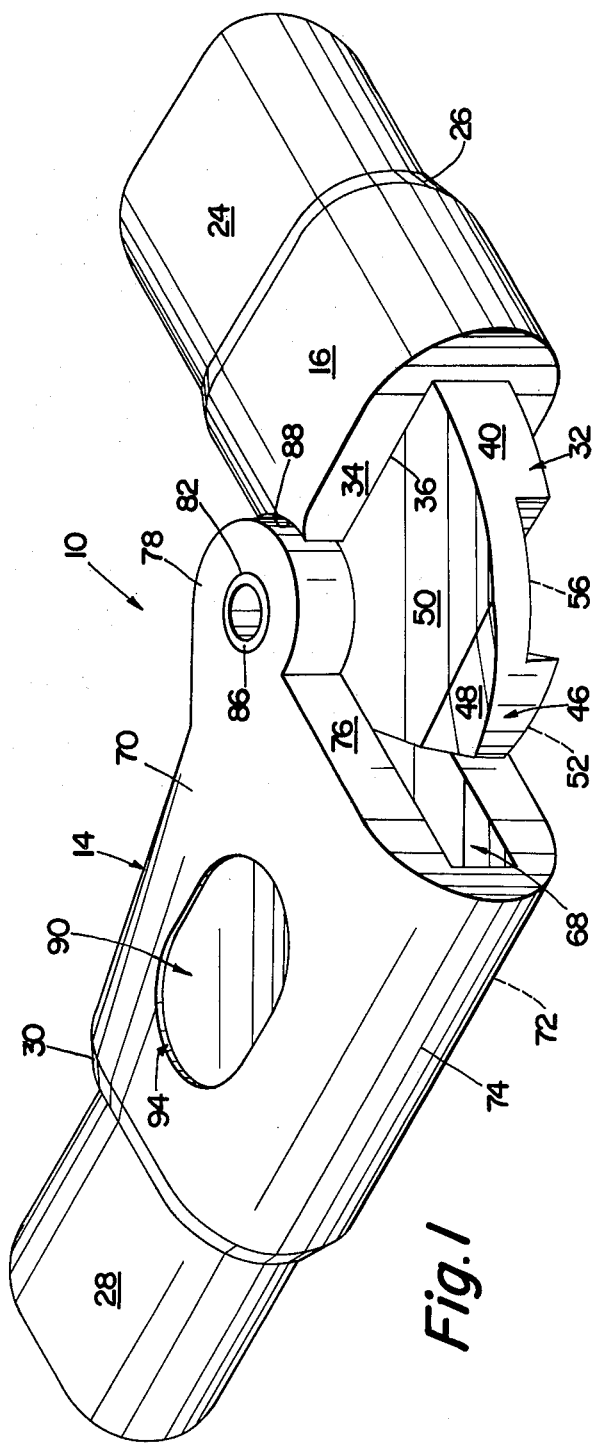
FIG. 1 is an isometric view of a rotary brace lock in accordance with the present invention, shown in open and unlocked configuration.
Figure 2:
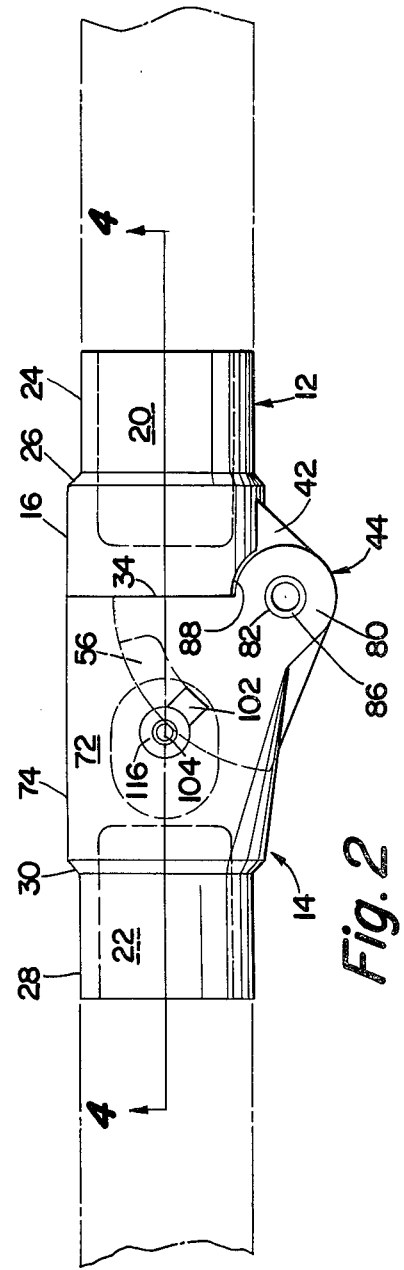
FIG. 2 is a side elevational view of a rotary brace lock in accordance with the present invention, the junction thereof with two structural members being shown in phantom lines.
Figure 4:
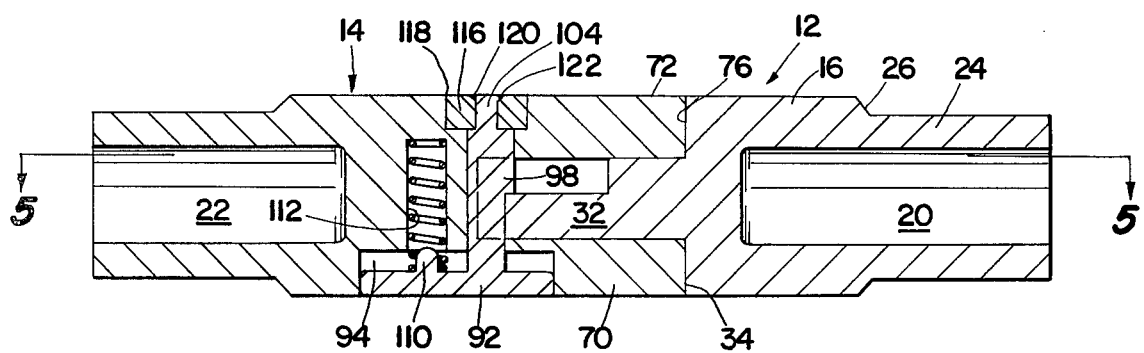
FIG. 4 is a sectional view, taken substantially along the line 4—4 of FIG. 2.

FIG. 1 illustrates a rotary brace lock or hinge which comprises the connection means of the present invention, designated generally as 10. The brace lock 10, shown in FIG. 1 in the open and unlatched configuration, is comprised of a latch plate member designated generally as 12 and a clevis member designated generally as 14. The latch plate member 12 has a central shank 16, which is shown to be generally ovate in geometry. Similarly, the clevis member 14 includes a central shank 18 having an overall geometry designed to functionally mate with the latch plate member 12, as described hereinbelow. Each of the latch plate member 12 and clevis member 14 is formed with an internal cavity, 20 and 22, respectively as best seen in FIGS. 2 and 3. The cavity 20 is circumscribed by a reduced shank portion 24 of the latch plate member 12 which merges to the central shank 16 at an outwardly progressing taper 26. In a similar fashion, the cavity 22 of clevis member 14 is circumscribed by a reduced shank portion 28 which merges with the central shank portion 18 at an outwardly progressing taper 30. As shown in phantom lines in FIG. 2, the reduced shank portion 24 and 28 are adapted to receive or secure tubular structural members internally thereof; which tubular members might be, for example segments of a scaffold. Obviously, the manner in which the brace lock 10 terminates for engagement with these structural elements might be modified in any convenient fashion in order to receive structural members having a different configuration. Indeed, solid structural members might be inserted within the opposing cavities 20 and 22. Variations along these lines will occur to those skilled in the art, and all such departures are deemed within the scope of the present invention.

As best seen in FIGS. 1 and 2, a latch tongue 32 projects outwardly from an end wall 34 of the shank 16 of latch plate member 12. The latch tongue 32 has a generally wedge-shaped overall geometry; and includes a first radial edge 36 coincident with end wall 34, a second radial edge 38 at the distal end thereof, and an arcuate edge 40 joining the radial edges 36 and 38. A third radial edge 42 extends from the apex area 44 of the latch tongue 32 and joins the same with the shank portion 16 of latch plate member 12 in order to afford reinforcement for that apex area.

The distal end of the latch tongue 32 is formed with a camming surface, designated generally as 46. The camming surface 46 is comprised of an outwardly directed taper 48 on the surface 50 of latch tongue 32 and a land 52, best viewed in FIG. 6, on the surface 54 of the latch tongue 32. This camming surface 46 is designed to cooperate with a similar camming surface or taper on a latch means for locking the latch plate member and clevis member together, as described below.

A latching recess 56 is formed in the surface 54 of latch tongue 32, and is located intermediately along the arcuate edge 40 thereof. The latching recess 56 is bounded by a bottom wall 58, a pair of end walls 60 and 62 and a side wall 64. A shoulder 66 lies intermediately the land 52 and end wall 60.

The clevis member 14 is comprised of a clevis channel 68 bounded by opposing side walls 70 and 72 of the central shank 18 of clevis member 14. A rounded top wall 74 completes the outer periphery defining the clevis channel 68, whereas an internal arcuate end wall 75 completes the interior shape of the channel. The central shank 18 terminates in an abutment wall 76 which mates with end wall 34 of central shank 16 of the latch plate member 12. This is, the clevis channel 68 is dimensioned to be only slightly larger than the dimensions of the latch tongue 32 whereby the walls 76 and 34 are in mating engagement when the brace lock 10 is in a closed configuration.

The side walls 70 and 72 each include an ear, 78 and 80, respectively. Each ear is formed with an aperture or bore 82. Similarly, an aperture or bore 84 is formed in the latch tongue 32 near the apex 44 of the wedge. When the brace lock 10 is assembled in the configuration shown in the figures of drawing, the apertures 82 and 84 are in alignment; and a pin member 86 may be inserted through this assembly. The pin 86, which might be a solid pin or a roll pin, serves as a pivot means whereby the latch plate member 12 and clevis member 14 are joined in rotary reciprocable engagement. That is, the latch tongue 32 may be rotated into the clevis channel 68 to a closed configuration and is also pivotally displaceable to an open configuration along an arcuate path. To facilitate this rotary motion, the central shank portion 16 of the latch plate member 12 is formed with arcuate notches 88. As noted above, the portion of the latch tongue 32 adjacent the third radial edge 42 serves to strengthen, and to provide added support for, this area of the brace lock 10.

Figure 6:
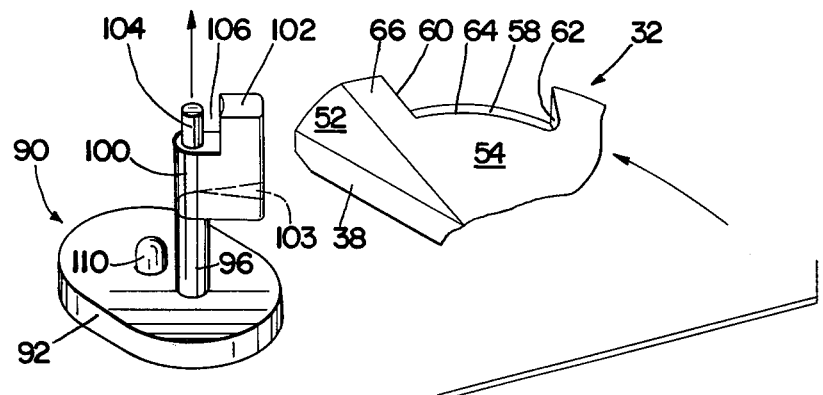
FIG. 6 is an exploded, fragmentary, isometric view showing the manner is which the latching tongue of the brace lock of the present invention cooperates with the latch pin thereof.
Figure 7:
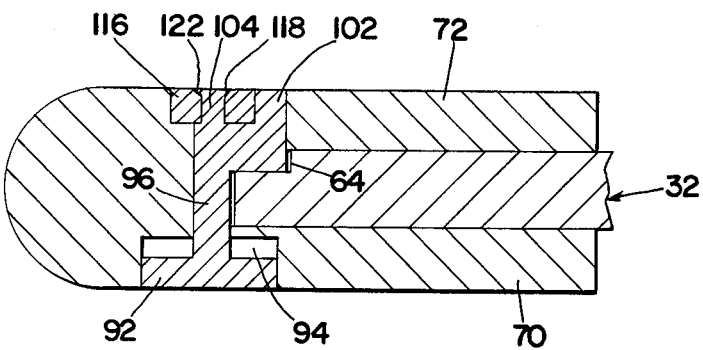
FIG. 7 is a sectional view, taken substantially along the line 7—7 of FIG. 5.
Figure 8:
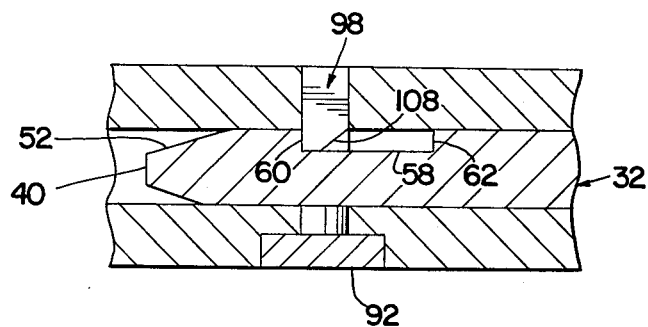
FIG. 8 is a sectional view, taken substantially along the line 8—8 of FIG. 5.

Latch means, designated generally as 90, are provided in the clevis member 14. The latch means 90, best viewed in FIGS. 4 and 6-8, is comprised of a latch button 92 which is received in a latch button recess 94 in side wall 70 of the clevis member 14. A latch post 96 projects outwardly from the button 92 and has formed thereon a generally "L-shaped" latch pin 98. The latch pin 98 is comprised of a first leg 100 attached to the post 96 intermediately along the length thereof. The other leg, 102, of the pin 98 extends generally parallel to the post 96. Because the latch pin 98 is secured to the post 96 intemediately its length, an end portion 104 is formed. Accordingly, a retainer channel 106 is provided between the leg 102 and the end portion 104. A land 108, best viewed in FIGS. 6 and 8, is formed on the leading edge of the latch pin 98; the land 108 being designed to cooperate with the land 52 on latch tongue 32 when the latter is rotated into engagement with the latching means 90, as described more fully below. A stub post 110 also projects outwardly of the latch button 92; the axis of the stub post 110 being parallel to, and displaced from, the axis of the latch post 96. A spring receiving channel 112 is formed interiorly of the latch latch button recess 94; the channel 112 preferably being a blind hole having an axis which is coincident with that of the stub post 110 when the connection is assembled in the configuration shown in, for example, FIG. A spring 114 is disposed within the channel 112 and projects over the stub post 110 to provide a biasing force on the latch means 90. Other suitable biasing means might be employed without, however, departing from the spirit of the present invention. As will be seen below, the biasing means are designed to urge the latching means into a latched configuration in a static condition. A retainer 116 is received in a retainer recess 118 in the side wall 72 of clevis member 14. Preferably, the retainer 116 is a circular member having a central aperture or bore 120 with an internal diameter approximately the same as the outer diameter of end portion 104 of latch post 96. The outer diameter of the retainer is preferably dimensioned such that a portion thereof is snugly received within the retainer channel 106 defined between the end portion 104 and leg 102 of the latch pin 98. Preferably, the inner surface of leg 102 is radiused to match the retainer, such that a loose interference fir is provided with respect to both the end portion 104 and cooperating aperture 120. In order to ensure positive engagement between the retainer 116 and latch post 96, the end portion 104 is upset or cold headed once the mechanism is assembled. To facilitate this operation, the retainer is formed with a chamfer 122 proximate the aperture 120.

Figure 5:
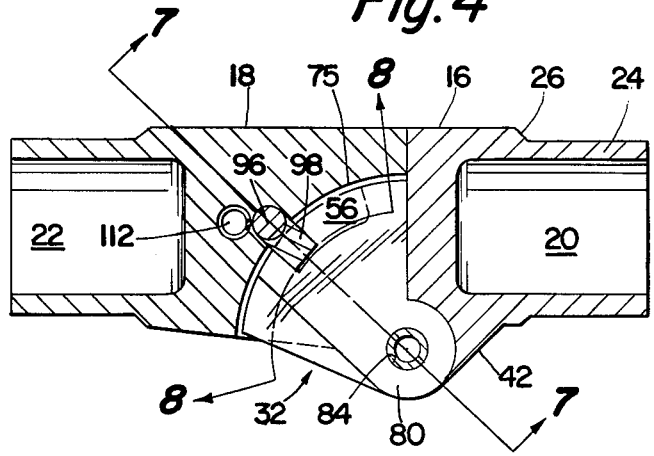
FIG. 5 is a sectional view taken substantially along the line 5—5 of FIG. 4.

With the brace lock 10 assembled as shown in, for example, FIGS. 1 and 2, the latch plate member 12 and clevis member 14 are relatively rotationally displaceable about the pin 86. As the two members are rotated, the latch tongue 32 will traverse an acruate path from the open configuration shown in FIG. 1 to the closed and latched configuration shown in FIG. 2. Because of the biasing effect of spring 114, the latching means 90 is normally in a latched configuration, whereby the latch pin 98 projects into this arcuate path of travel of the latch tongue from a position intermediately along the arcuate end wall 75 of the clevis 14, as best viewed in FIG. 5. When the latch tongue moves into engagement with the latch means 90, the land 52 on the former will contact the land or taper 108 on the latter and cam the latch means 90 against the force of spring 114 in a path transverse to the arcuate path. Further inward motion of latch tongue 32 will cause the bottom surface of leg 100 to ride over the shoulder 66 until the latch pin passes beyond the shoulder and into the latching recess 56. Thereupon, the spring 114 will return the latching pin to its static configuration whereby the pin is firmly received within the recess 56 in locking engagement with the end wall 60. Once in this closed and locked configuration of FIG. 2, the brace lock 10 is very rigid and provides extremely good force transfer from one end to the other, across the rotatable joint as well as between the end wall 34 and the abutment wall 76. Hence, any structural members joined by the brace lock 10, as shown in phantom lines in FIG. 2, are joined in very positive engagement. To rotate these structural members to, for example, collapse the same, the brace lock 10 may be unlatched by simply depressing the latch button 92. This will cause the latch plate to be displaced proximally away from the recess 56 and shoulder area 66, whereby the latch plate and clevis members may be folded or rotated about the pivot. Because the latch button 92 is substantially flush with, or perhaps even recessed within, the side wall 70, accidental unlocking or release of the brace lock 10 is minimized.

Construction of the brace lock 10 of the present invention is also materially simplified due to the simplicity of the overall configuration. For example, the individual components may be very easily cast from conventional casting alloys, e.g., aluminum alloys which possess sufficient strength characteristics to be serviceable in the environment for which the present invention is intended. Likewise, assembly from the individual components is also quite simple and, hence, expedient in terms of production output. Numerous other advantages are provided both in terms of production and use of the brace lock made in accordance with the present invention.

While the present invention has now been described with reference to certain preferred embodiments, the skilled artisan will recognize that various substitutions, changes, modifications, and omissions may be made without departing from the spirit thereof. Accordingly, it is intended that the scope of the present invention be limited solely by that of the following claims.

I claim:

1. A multi-element connection for joining structural members secured thereto into an automatically locked co-linear arrangement, and adapted to be rotated or folded to bring the structural members into such co-linear arrangement from an unlocked configuration, said connection comprising:

(a) a latch member adapted to secure a structural member thereto, said latch member including an outwardly projecting latch tongue having a latching recess formed therein;

(b) a clevis member adapted to secure a structural member thereto, said clevis member including a clevis channel for receiving said latch tongue;

(c) pivot means joining said latch and clevis members in rotary reciprocable engagement, whereby said latch tongue is received in said clevis channel in a closed and locked configuration, and is pivotally displaceable to an open and unlocked configuration along an arcuate path;

(d) latch means reciprocably received in said clevis member and transversely displaceable with respect to said path from a latched configuration, wherein said latch means projects into said path, to an unlatched configuration, wherein said latch means is displaced proximally away from said path, said latch means including latch pin means for engaging said latching recess;

(e) said latch tongue being a generally wedge-shaped tongue having a first radial edge coincident with an abutment end wall of said latch plate member and a second radial edge at the distal end thereof, said radial edges joined by an arcuate edge, said latch tongue further including a camming surface at said distal end for displacing said latch means from said latched to said unlatched configurations as said latch tongue is pivoted from said open to said closed configurations.

2. The mutli-element connection defined in claim 1, wherein said clevis channel is a generally arcuate channel comprised of a pair of side wall terminating in a pair of abutment end walls and a radial end wall.

3. The multi-element connection defined in claim 2, wherein said clevis channel is a generally arcuate channel comprised of a pair of side walls terminating in a pair of abutment end walls and a radial end wall and latch pin means is disposed intermediately along the length of said radial end wall and projects outwardly from one of said side walls when in the latched configuration.

4. The multi-element connection defined in claim 2, wherein said clevis channel is a generally arcuate channel comprised of a pair of side walls terminating in a pair of abutment end walls and a radial end wall and wherein:

(a) each of said side walls further comprises an ear at the lower end thereof, each of said ears having a transverse bore formed therein;

(b) said tongue has a bore located proximally of the apex of said radial edges; and, (c) said pivot means comprises a pin member inserted through each of said bores in said ears and tongue.

5. The multi-element connection defined in claim 3, wherein said latch means comprises:

(a) a latch button received in a button recess formed in said clevis member;

(b) a latch post projecting outwardly of said button; and, (c) a generally "L-shaped" latch pin having a first leg attached to said post and the second leg substantially parallel to said post, the edge of said first leg comprising the leading edge of said latch pin means.

6. The multi-element connection defined in claim 5, wherein said latch means comprises: (a) a latch button received in a button recess formed in said clevis member; (b) a latch post projecting outwardly of said button; and (c) a generally "L-shaped" latch pin having a first leg attached to said post and the second leg substantially parallel to said post, the edge of said first leg comprising the leading edge of said latch pin means; and (d) said first leg is attached to said latch post intermediately along the length thereof, thereby forming a channel between said post and said second leg.

7. The multi-leg connection defined in 5, further comprising a retainer received in a retainer recess in said clevis member, said retainer engaging the terminal end of said latch post.

8. The multi-element connection defined in claim 6, further comprising:
 (a) a stub post projecting outwardly of said button having an axis disposed parallel to, and displaced from, said latch post;
 (b) a spring receiving channel formed interiorly of said button recess and having an axis coincident with that of said stub post; and,
 (c) a spring disposed within said channel and projecting over said stub post for biasing said latch pin into said latched configuration.

9. The multi-element connection defined in claim 7, wherein said latching recess is formed intermediately along the arcuate edge of said tongue.

* * * * *

UNITED STATES PATENT AND TRADEMARK OFFICE
CERTIFICATE OF CORRECTION

PATENT NO. : 4,286,353
DATED : September 1, 1981
INVENTOR(S) : John N. Roche

It is certified that error appears in the above—identified patent and that said Letters Patent is hereby corrected as shown below:

Column 1, line 44, "conopy" should read ---canopy---;

Column 3, line 61, "This" should read ---That---;

Column 4, line 41, delete the word "latch";

Column 4, line 44, after "FIG." should read "4";

Column 4, line 62, "fir" should read ---fit---;

Column 4, line 68, "chamfer" should read ---chamber---;

Column 5, line 5, "acruate" should read ---arcuate---.

Signed and Sealed this

Twenty-fourth Day of November 1981

[SEAL]

Attest:

Attesting Officer

GERALD J. MOSSINGHOFF

Commissioner of Patents and Trademarks